United States Patent [19]
Altmire et al.

[11] Patent Number: 4,995,009
[45] Date of Patent: Feb. 19, 1991

[54] CASTABLE FISH/DEPTH FINDER

[76] Inventors: Jeffrey J. Altmire, 23 E. Maple St., Alexandria, Va. 22301; John E. Paskert, 2582-F Arlington Mill Dr., Arlington, Va. 22206

[21] Appl. No.: 562,668

[22] Filed: Aug. 3, 1990

[51] Int. Cl.$^5$ .............................................. G01S 15/96
[52] U.S. Cl. .................................. 367/107; 367/910; 43/17.1; 73/290 R
[58] Field of Search ......................... 367/99, 107, 910; 73/290 R; 43/17, 17.1, 17.2, 43.1

[56] References Cited

U.S. PATENT DOCUMENTS

| | | | |
|---|---|---|---|
| 3,564,490 | 2/1971 | Camp | 367/910 |
| 4,225,952 | 9/1980 | Lewis | 367/910 |
| 4,891,902 | 1/1990 | Whitney, Jr. | 43/44.87 |

Primary Examiner—Ian J. Lobo
Attorney, Agent, or Firm—Walter F. Wessendorf, Jr.

[57] ABSTRACT

The castable fish/depth finder has a display unit, rod and reel, transducer and conductors establishing electrical continuity from the display unit to the rod and reel, and therefrom to the transducer. The conductor from the rod and reel to the transducer additionally functions as mechanical means for conventional casting by an onshore fisherman of the transducer to a particular section of a body of water. The presence of fish in such particular section and the water depth is ascertained and indicia therefor is displayed on a screen of the display unit.

3 Claims, 2 Drawing Sheets

CASTABLE FISH/DEPTH FINDER

BACKGROUND OF THE INVENTION

1. Technical Field

This invention relates to a castable fish/depth finder by which an onshore fisherman can ascertain whether there are fish in a particular section of a body of water as well as the depth of the water.

2. Background

There is a need for an onshore fisherman to be able to ascertain the depth of the water in a particular section of a body of water where he proposes to fish and to ascertain whether there are fish in such section in order to make it worthwhile and productive for the onshore fisherman to spend his time and effort fishing in that particular section of the body of water.

SUMMARY OF THE INVENTION

Accordingly, the object of the invention is to contribute to the solution of the discussed problem of the art by providing a castable fish/depth finder that has a transducer that can be conventionally cast by rod and reel by an onshore fisherman to a particular section of a body of water to ascertain and indicate for the fisherman whether there are fish in such section of water and the depth of the water. A fish/depth finder display unit, with electrical continuity established from the display unit through the reel and to the transducer, ascertains and indicates by its screen whether there are any fish and the depth of the water. Such electrical continuity is established via twin conductor cables with the conductor cable from the reel to the transducer functioning both for electrical transmission and as mechanical means for winding on the reel and paying out therefrom for casting.

BRIEF DESCRIPTION OF THE DRAWINGS

This object and other objects of the invention should be discerned and appreciated by reference to the DETAILED DESCRIPTION OF THE PREFERRED EMBODIMENT taken in conjunction with the drawings, wherein like reference numerals refer to similar parts throughout the several drawing figures, in which:

FIG. 3 is an enlarged view of the transducer cast to the particular section of the body of water.

DETAILED DESCRIPTION OF THE PREFERRED EMBODIMENT

Figure 1:
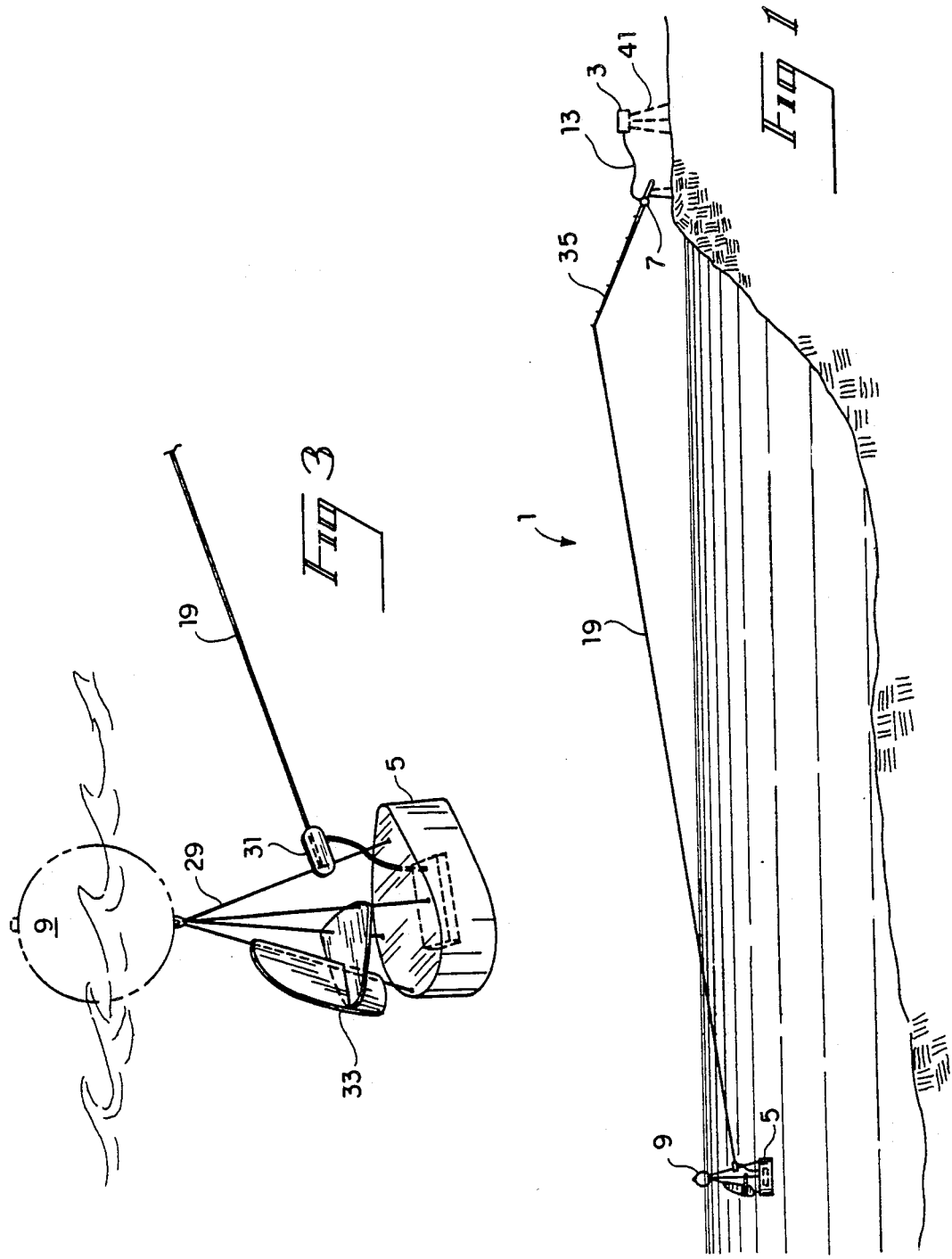
FIG. 1 is a view showing the fish/depth finder unit onshore and the transducer cast to a particular section of the body of water to ascertain and indicate whether there are any fish in such section and the depth of the water.
Figure 2:
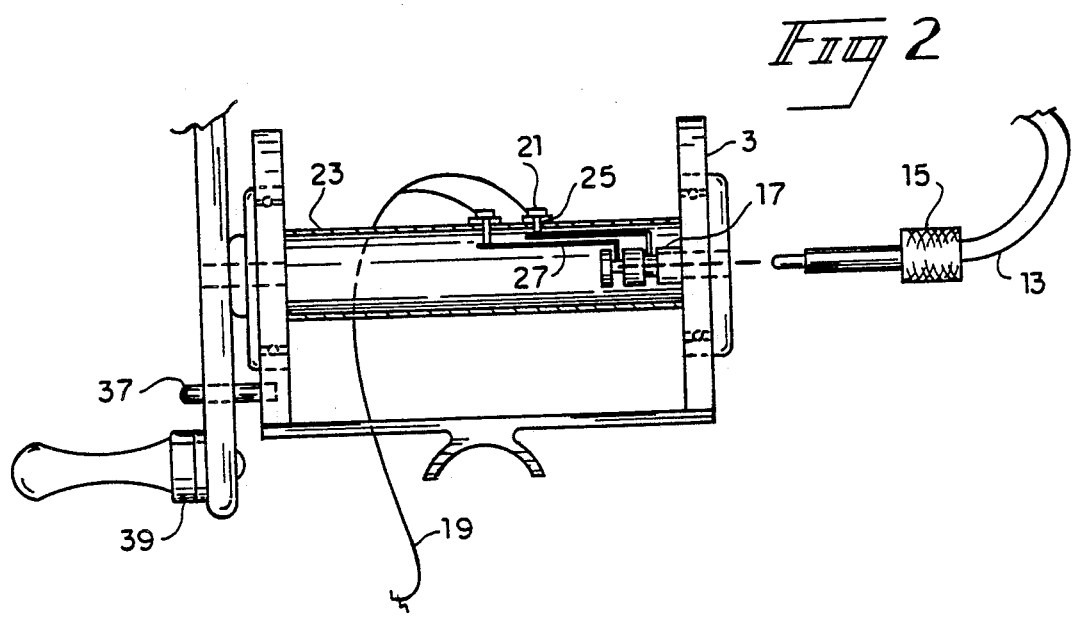
FIG. 2 is an enlarged view of the reel employed.
Figure 4:
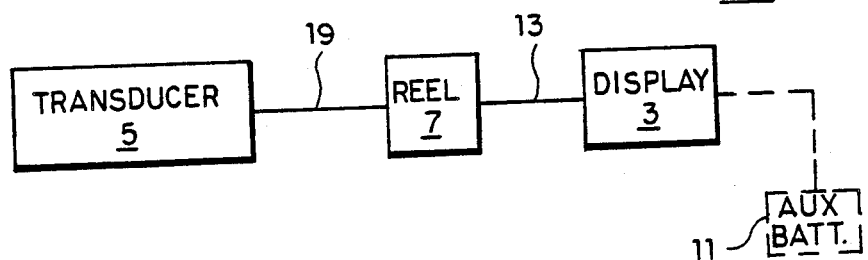
FIG. 4 is a block diagram of components of the invention.

In FIG. 1 of the drawings, reference numeral 1 generally refers to the invention of the castable fish/depth finder comprising a fish/depth finder display unit 3 and a fully encased, waterproof transducer 5, reel 7 and common bobber 9. The display unit 3 and transducer 5 are of the type manufactured by Techsonic Industries, Inc., Three Humminbird Lane, Eufaula, Ala. 36027 / U.S.A and sold as Model Number LCR 400 Portable, or other suitable display unit and transducer. A battery power source 11 provides power generation for the display unit 3. Twin electrical conductor cable 13 from display unit 3 terminates in jack 15 that is inserted in the armature 17 of reel 7. Similar conductor cable 19 is connected by two solderless terminal connectors 21 that are attached to the rotating cylinder 23 of reel 7 by two screws 25 that penetrate cylinder 23 and connect to two metal finger strips 27 maintained in electrical continuity with armature 17. Conductor cable 19 is terminally connected to transducer 5. A support harness 29, fixed to and depending from common bobber 9, mounts both a line tension reliever 31, transducer 5 and stabilizers 33 which function to maintain the transducer 5 in upright position under the water. Conductor cable 19 is wound in a counterclockwise direction on cylinder 23 of reel 7. In casting transducer 5 to a section of a body of water, the cable 19 is payed out in a clockwise unwinding direction from cylinder 23 through eyelets (not shown) on rod 35. A conventional locking mechanism 37 is provided to allow handle 39 and cylinder 23 to be locked or unlocked. Conductor cable 19 functions both for electrical transmission and as the mechanical means for casting out and retrieving the transducer 5.

OPERATIONAL DESCRIPTION

An onshore fisherman utilizes the invention to ascertain and indicate whether fish are in a particular section of a body of water and the depth of the water in such section to aid the onshore fisherman in making his judgment whether there are sufficient fish in such section to make it worthwhile to fish in such section; and, if his judgment is that it is not worthwhile to fish in such section, the onshore fisherman utilizes the fish/depth finder 1 to locate another section of the body of water where it is worthwhile for him to fish. Accordingly, the onshore fisherman employs the rod 35 and reel 7 in a conventional manner to cast out bobber 9 to a particular section of a body of water. The common bobber 9 floats on the water and via its support harness 29 disposes transducer 5 beneath the surface of the water with stabilizers 33 maintaining the transducer 5 in upright position. First electronic signals generated in unit 3, shown optionally mounted in FIG. 1 on an onshore tripod 41, are received by transducer 5 and changed by transducer 5 to first ultrasonic signals and send such first ultrasonic signals in a downward direction directly towards the bottom of the body of water. The stabilizers 33 assure that such first ultrasonic signals are sent in such downward direction directly towards the bottom of the body of water. Such first ultrasonic signals travel in their direct downward direction until they strike the bottom of the body of water or fish above the bottom of the body of water. Upon striking the bottom of the body of water or fish, the first ultrasonic signals produce second ultrasonic or echo signals that bounce back to and are received by the transducer 5 that change the second ultrasonic signals to second electronic signals that are received by display unit 3 and displayed on the screen of unit 3 as indicia that indicate the existence of fish in and the depth of the water in that particular section of the body of water.

What we claim:

1. In combination, a castably fish/depth finder for use by an onshore fisherman for continuously ascertaining and indicating the presence of fish in a particular section of a body of water and the depth of the water in such particular section, including:

onshore fish/depth display unit means for continuously sending first electronic signals and for continuously receiving second electronic signals, respectively, and, for continuously indicating, responsive to said respective second electronic signals, the presence of fish in such particular section of such body of water and the depth of the water in such particular section;

power source means powering said display unit means;

transducer means for receiving said continuous first electronic signals from said onshore display unit means, for changing said first electronic signals to continuous and respective first ultrasonic signals travelling downwardly through such particular section of the body of water until said first ultrasonic signals strike the bottom of such body of water or fish above the bottom of such body of water to produce continuous second ultrasonic or echo signals, respectively, bouncing back to said transducer means, and receiving and changing said second ultrasonic or echo signals to said second electronic signals for reception by said onshore display unit means for indication by said onshore display unit means of the presence of fish and the depth of the water in such particular section of the body of water;

first conductor means for electrically connecting and establishing continuity of said onshore display unit means with onshore rod and reel means;

second conductor means for electrically connecting and establishing continuity of said onshore rod and reel means with said transducer means; and said onshore rod and reel means having connecting means for electrically connecting and establishing continuity between said first conductor means and said second conductor means, said rod and reel means receiving in winding relationship only said second conductor means in response to winding action by the onshore fisherman of said rod and reel means, and said rod and reel means paying out only said second conductor means in response to casting action by the onshore fisherman to dispose and place said transducer means offshore in such particular section of the body of water.

2. A castable fish/depth finder in accordance with claim 1, wherein said fish/depth finder further includes a bobber floating on the water and disposing, in depending relationship therefrom, said transducer means.

3. A castable fish/depth finder in accordance with claim 1, wherein said connecting means of said rod and reel means electrically connects and establishes such continuity between said first conductor means and said second conductor means, said connecting means comprising armature means, screw means and metal finger strip means, wherein said first conductor means has terminal jack means, wherein said armature means of said connecting means receives said terminal jack means in inserting relationship therein and maintains electrical continuity with said first conductor means, wherein said screw means of said connecting means attaches said second conductor means to said metal finger strip means and maintains electrical continuity of said second conductor means with said metal finger strip means and wherein said metal finger strip means engages said armature means and maintains electrical continuity with said armature means and thereby electrically connects and established continuity between said first conductor means and said second conductor means.

* * * * *